United States Patent [19]

Wada et al.

[11] Patent Number: 4,739,470
[45] Date of Patent: Apr. 19, 1988

[54] DATA PROCESSING SYSTEM

[75] Inventors: Kenichi Wada, Zama; Yooichi Shintani, Kokubunji; Tsuguo Shimizu, Sayama; Akira Yamaoka, Hadano, all of Japan

[73] Assignee: Hitachi, Ltd., Tokyo, Japan

[21] Appl. No.: 489,349

[22] Filed: Apr. 28, 1983

[30] Foreign Application Priority Data

Apr. 30, 1982 [JP] Japan ................................ 57-71210

[51] Int. Cl.⁴ .............................................. G06F 9/38
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| Re. 26,171 | 3/1967 | Falkoff | 364/200 |
| 3,787,673 | 1/1974 | Watson et al. | 364/200 |
| 4,305,124 | 12/1981 | Marro et al. | 364/200 |
| 4,476,525 | 10/1984 | Ishii | 364/200 |
| 4,507,728 | 3/1985 | Sakamoto et al. | 364/200 |
| 4,532,589 | 7/1985 | Shintani et al. | 364/200 |

*Primary Examiner*—Thomas M. Heckler
*Assistant Examiner*—Christina M. Eakman
*Attorney, Agent, or Firm*—Antonelli, Terry & Wands

[57] ABSTRACT

A data processing system for executing an instruction in a plurality of stages in a pipeline mode comprises a main operation unit capable of executing all instructions to be executed in the data processing system, a pre-operation unit capable of executing instructions which occurs at a high frequency and can be executed with a small number of circuit components, general purpose registers for storing operation results of the instructions, and a control unit for controlling the writing of the operation results by the main operation unit and the pre-operation unit into the general purpose registers.

11 Claims, 14 Drawing Sheets

DATA PROCESSING SYSTEM

The present invention relates to a pipelined data processing system, and more particularly to a pipelined data processing system in which an instruction is executed in a plurality of stages each having an independent hardware and the stages are operated in an overlapped mode.

In a prior art pipelined data processing system, an instruction is executed in five to seven stages with each stage being operated in one machine cycle (basic cycle of the data processing system) and the stages are operated in an overlapped mode so that each instruction is apparently executed in one cycle.

By way of example, let us assume that an instruction is processed in five stages, that is, a D-stage in which the instruction is decoded and an operand address is determined by adding a content of a general purpose register designated by an index field of the instruction, a content of a general purpose register designated by a base field of the instruction and a content of a displacement field of the instruction; an A-stage in which the logical operation address determined in the D-stage is converted to a physical address actually used to access a memory, an L-stage in which an operand is fetched from a buffer memory which is a high speed memory containing a portion of data of a main memory, or from a general purpose register based on the physical address converted in the A-stage; an E-stage in which an operation is carried out using the operand fetched in the L-stage; and a P-stage in which an operation result is stored in the memory or the general purpose register. For example, the D-stage for an instruction ① is processed in one machine cycle of the data processing system and the A-stage for the instruction ① is processed in the next machine cycle and the D-stage for the succeeding instruction ② is simultaneously processed, and similarly the succeeding instructions ③ and ④ executed simultaneously with the preceding instructions one stage later so that each instruction is effectively executed in one machine cycle. However, when the address for executing the current instruction is determined in accordance with a result of the execution of the preceding instruction such as when an L(load)-instruction to load a content of the memory to a register is followed by an A(add)-instruction to add an operand stored at an address specified by the content of the above register (this being called an address conflict), the D-stage for the current instruction cannot be executed until the D-stage for the preceding instruction has been completed. As a result, the execution is delayed and the performance of the data processing system is degraded.

Approaches to reduce such a delay have been proposed by Japanese Patent Publication No. 9088/82 and Japanese Patent Application No. 194002/81 (corresponding to U.S. Ser. No. 446,002) both filed by Hitachi Ltd., the same assignee as the present application, in which in addition to a main operation unit which can carry out operations required by any instruction, a pre-operation unit capable of carrying out only simple operations (many of the instructions which cause the address conflict such as the L-instruction and the A-instruction can be processed by an operation unit having a relatively small number of component circuits) is arranged in the vicinity of a hardware unit for the D-stage so that the operation result of the preceding instruction is produced earlier by the pre-operation unit and it is utilized to process the succeeding instruction. In this manner, the delay of the data processing due to the address conflict can be reduced. However, in the system disclosed in the Japanese Patent Publication No. 9088/82, a buffer memory for storing the output of the pre-operation unit is not provided and hence the pre-operation can be carried out only for the immediately preceding instruction to the current instruction. In the system disclosed in the Japanese Patent Application No. 194002/81, a buffer for storing the output of the pre-operation unit is provided but the buffer is separately arranged from a general purpose register. Accordingly, the number of circuit components required is large. In the system of the Japanese Patent Publication No. 9088/82, it is necessary to select an index for an address calculator for calculating an address to process the instruction from the general purpose register or the pre-operation unit and hence a selector is needed. In the system of the Japanese Patent Application No. 194002/81, a selector for selectively reading an index from the general purpose register or the buffer to the address calculator is needed and hence additional circuit components for the selector are required.

It is an object of the present invention to provide a pipelined data processing system having a high processing speed which resolves the problems encountered in the prior art.

In the data processing system of the present invention, in order to prevent the degradation of the system performance due to the address conflict, a pre-operation unit is provided in addition to a main operation unit and both outputs of the main operation unit and the pre-operation unit are stored in general purpose registers.

By storing the output of the pre-operation unit in a plurality of general purpose registers, the pre-operation can be carried out for the preceding instruction other than the immediately preceding instruction and the operation result can be stored for use by the succeeding instruction. By storing the outputs of both operation units in the general purpose registers, the number of circuit components required for the buffer, the selector and the control therefor is significantly reduced in comparison with the case where the output of the pre-operation unit is stored in a buffer other than the general purpose register.

In storing the outputs of both the main operation unit and the pre-operation unit in the general purpose register, it may happen that an operation result different from that which would be obtained when a plurality of instructions are processed in a programmed sequence is stored in the general purpose registers. By way of example, let us assume that instructions $I_1$, $I_2$, $I_3$, $I_4$ and $I_5$ are to be processed and that these instructions are to be processed in the order of $I_1$, $I_2$, . . . $I_5$ by the program, and the instructions $I_1$, $I_3$, $I_4$ and $I_5$ can be processed by the pre-operation unit while the instruction $I_2$ cannot be processed by the pre-operation unit but must be processed by the main operation unit. In the execution of the instructions $I_1$ through $I_5$, the operation results for the instructions $I_1$, $I_3$, $I_4$ and $I_5$ by the pre-operation unit are stored in the general purpose register in the order of the processing of those instructions but the operation result for the instruction $I_2$ is obtained later because the instruction $I_2$ is processed by the main operation unit. Accordingly, the operation result for the instruction $I_2$ is stored in the general purpose register simultaneously with or later than the storing of the operation result of the instruction $I_3$ into the general purpose register. In other words, the operation result for the instruction $I_3$ is stored in the general purpose register simultaneously with or earlier than the storing of the operation result for the instruction $I_2$ into the general purpose register. Therefore, if the program is constructed such that the operation results for the instructions $I_2$ and $I_3$ are to be stored in the general purpose register of the same address (this being called an operand register conflict), the content of the register to which the operation result for the instruction $I_3$ has been stored is subsequently replaced by the operation result for the instruction $I_2$. As a result, a data other than the operation result for the instruction $I_3$, which are expected to be processed in the order of the instructions $I_1, I_2, \ldots I_5$ by the program, is left in the register.

In order to resolve the above problem, in accordance with one embodiment of the present invention, there is provided means for storing the operation result for the succeeding instruction into the general purpose register after the operation result for the preceding instruction in the program has been stored in the general purpose register. The following two approaches for such means are disclosed herein.

In one approach, addresses of the general purpose registers to which the operation results for two instructions in a sequence of instructions in the program, for example, the instructions $I_2$ and $I_3$, are to be stored are compared, and if they are not equal, it is permitted to store the operation result for the instruction $I_3$ into the register prior to the storing of the operation result for the instruction $I_2$ into the register, and if the addresses are equal, the storing of the operation results for the instruction $I_3$ and the succeeding instructions is inhibited into the register until the storing of the operation result for the instruction $I_2$ into the register is completed. In this case, the address of the register to which the operation result for the instruction $I_2$ is to be stored and the addresses of the registers to which the instructions other than the instruction $I_3$, for example, the instruction $I_4$, are to be stored are compared and similar processing is carried out.

In another approach, the storing of the operation results for the instruction $I_3$ and the succeeding instructions into the registers is unconditionally inhibited until the storing of the operation result for the instruction $I_2$ into the register is completed without regard to whether the addresses of the registers to which the operation results for the instructions $I_2$ and $I_3$ are to be stored are equal or not.

BRIEF DESCRIPTION OF THE DRAWINGS

The above and other features and advantages of the present invention will be apparent from the following description taken in conjunction with the accompanying drawings, in which.

DEATILED DESCRIPTION

One embodiment of the present invention is now explained. The present embodiment can execute instructions used in the IBM System/370 computer. The operation of this system is described in "IBM System/370 Principle of Operations" published by IBM. In the present specification, therefore, the explanation of the operation of the above system is omitted unless specifically needed and the terms used therein are used without explanation unless specifically needed. In the data processing system of the present invention, one instruction is executed in a plurality of stages and the instructions are executed in a pipeline fashion such that different stages for different instructions are executed in parallel. In the present embodiment, the stages D, A, L, E and P are executed as is done in the prior art.

Figure 1:
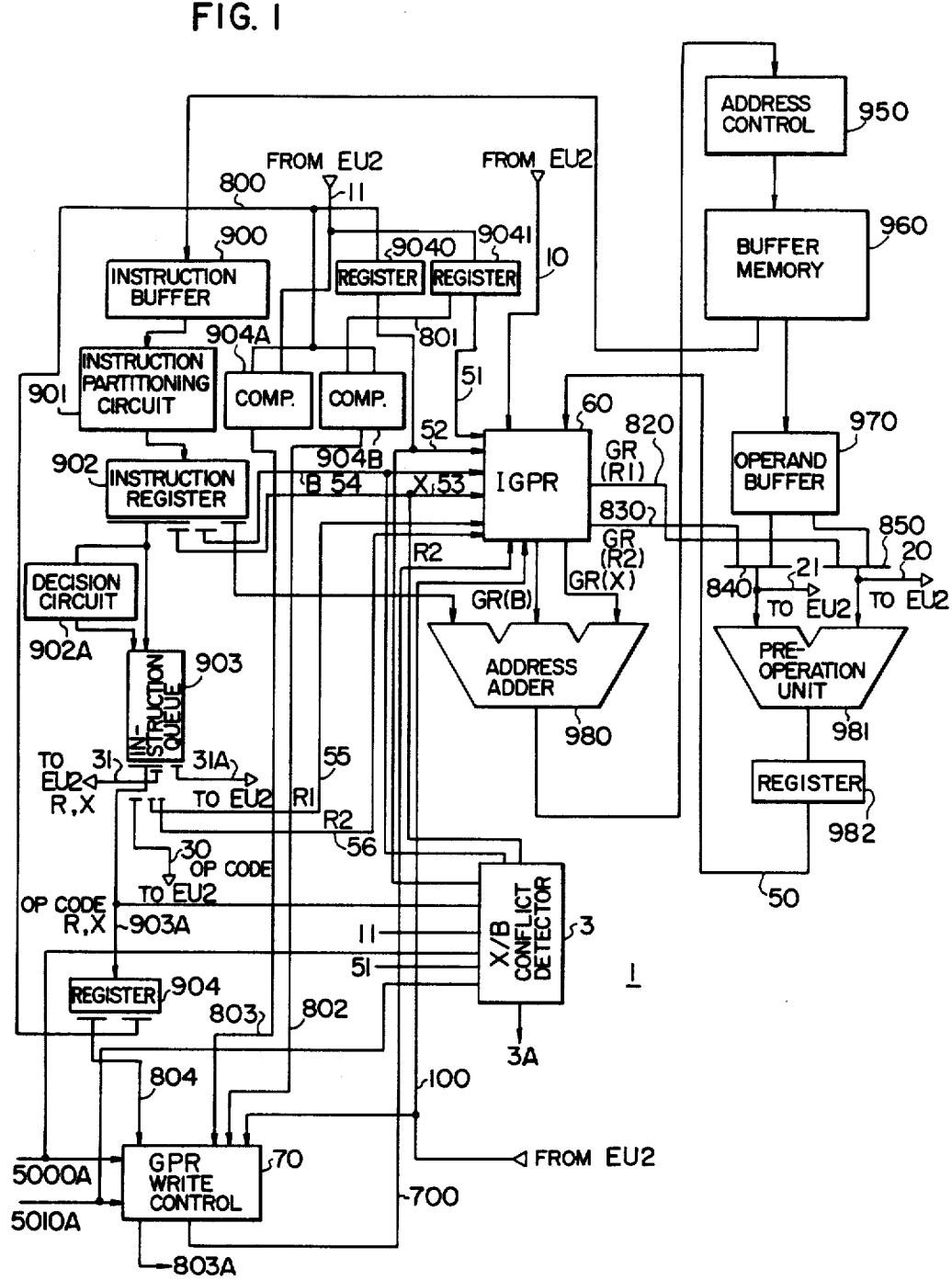
FIG. 1 shows a detail of an instruction unit in a first embodiment of a data processing system.
Figure 2:
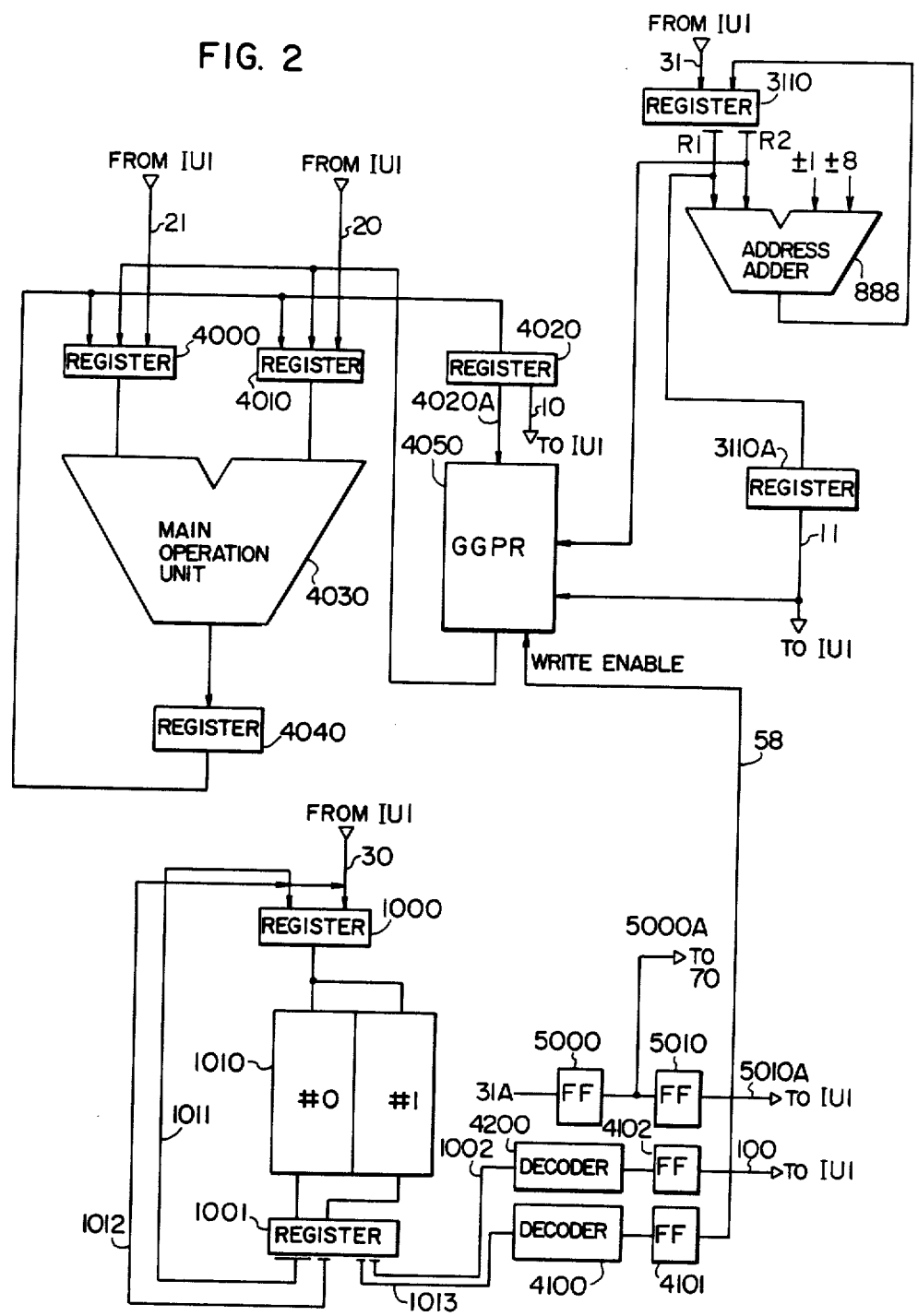
FIG. 2 shows a detail of an execution unit in the first embodiment.
Figure 3:
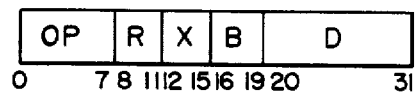
FIG. 3 shows an instruction format used in the data processing system.

FIG. 1 shows a configuration of an instruction unit (I-unit) 1 in the data processing system of the present invention, and FIG. 2 shows a configuration of an execution unit (E-unit) in the data processing system. In FIG. 1, numeral 960 denotes a buffer memory which is a high speed memory for temporarily storing data including instructions necessary for operation, of a content of a main memory (not shown), numeral 900 denotes an instruction buffer for temporarily storing instructions fetched from the buffer memory 960, numeral 901 denotes an instruction partitioning circuit for fetching an instruction from one word of instructions in the instruction buffer 900, and numeral 902 denotes an instruction register to which the instruction fetched by the instruction partitioning circuit 901 is loaded. The instructions used in the data processing system of the present embodiment are the same as those used in the IBM System/370 computer and they are classified into several formats. For example, an RX format instruction shown in FIG. 3 is used. The RX format instruction has 32 bits (bit 0 to bit 31), of which the bits 0–7 are an operation code to represent a type of instruction such as A or L, the bits 8–11 are a register field (R) representing a register number of a general purpose register in which an operand to be read out for the operation is stored or a register in which an operation result is to be stored, the bits 12–15 and the bits 16–19 are an index field (X) and a base field (B), respectively, which represent register numbers of I general purpose registers (IGPR) 60 and G general purpose registers (GGPR) 4050 to be described later, which are used to calculate an operand address, and the bits 20–31 are a displacement field (D) which represents a displacement used to calculate the general purpose register number based on the index field and the base field. The RX format instruction includes the A-instruction and the L-instruction. One word of the instruction buffer 900 comprises 72 bits and contains one or more instructions. The instruction partitioning circuit 901 partitions an instruction to be fetched from one word in the instruction buffer 901.

Numeral 902A denotes a decision circuit which determines whether or not the instructions stored in the instruction register 902 can be processed only by a main operation unit 4030 in the E-unit 2 shown in FIG. 2 and the operation results stored in the IGPR 60, based on the operation codes of the instructions, and produces a "1" output if the decision is negative and "0" output if the decision is affirmative. Numeral 903 denotes an instruction queue register which sequentially stores the first two bytes (bits 0–15) of an instruction loaded in the instruction register 902 and the output of the decision circuit 902A to form an instruction execution queue, and numeral 904 denotes a work register in which the first two bytes of the instruction from the instruction queue register 903 are loaded. Numeral 9040 denotes a register in which an address of an operation result write register designated by the bits 8–11 of the instruction loaded in the register 904 is loaded, numeral 9041 denotes a register in which an address of an operation result write register loaded in a register 3110 of FIG. 2 is loaded through a line 11, and numerals 904A and 904B denote comparators which compare the bits 8–11 (register field) of the instruction loaded in the register 904 with the content of the register 3110 in FIG. 2 and the content of the register 9041, respectively.

Figure 4:
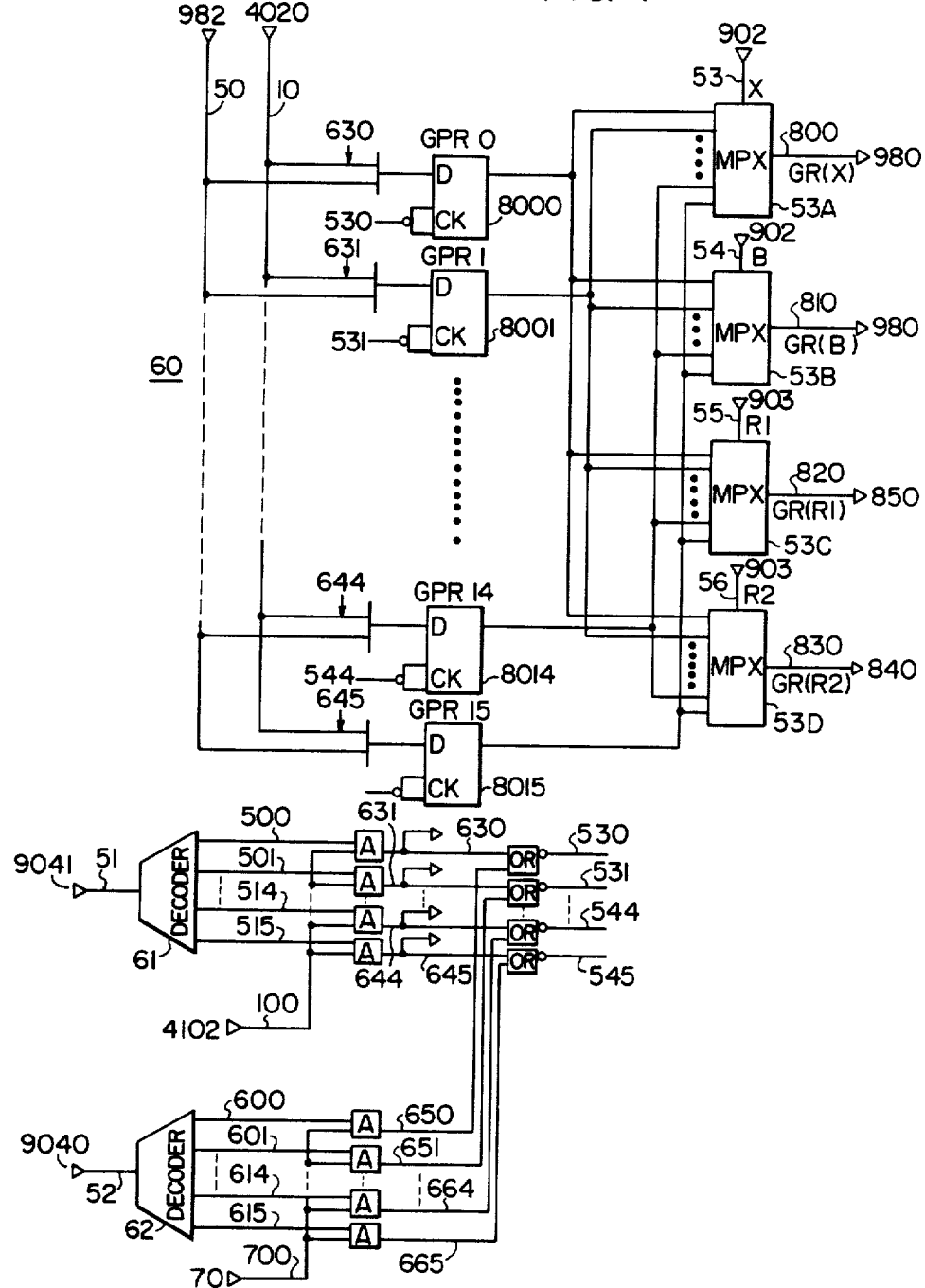
FIG. 4 shows a detail of a general purpose register shown in FIG. 1.
Figure 6:
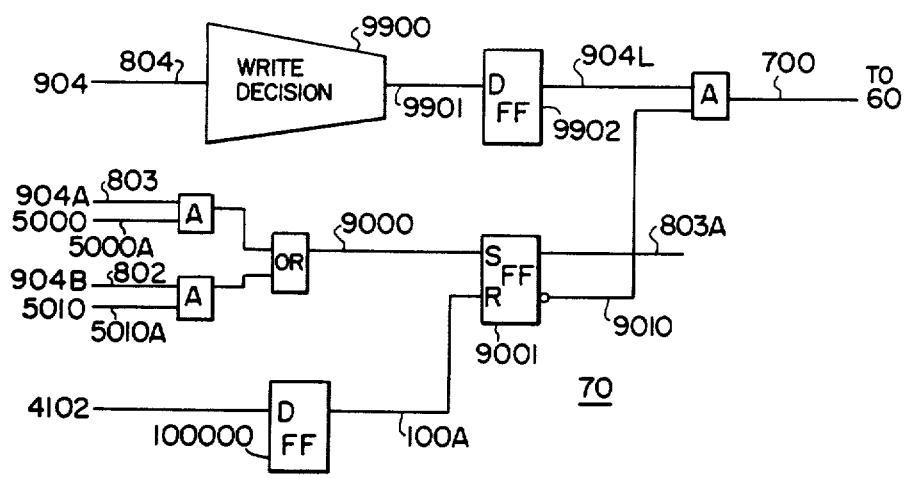
FIG. 6 shows a detail of a general purpose register write control shown in FIG. 1.

Numeral 3 denotes an X/B conflict detector which detects the index/base register conflict in which the index register numbers or the base register members of the proceeding instruction and the succeeding instruction are equal, based on the contents of the registers 9040 and 9041 and the index field and the base field of the instruction loaded in the instruction register 902. Numeral 60 denotes the general purpose registers (GPR). In order to distinguish them from the general purpose registers 4050 in the E-unit 2 of FIG. 2, the GPR's of the I-unit 1 in FIG. 1 are referred to as IGPR's and the GPR's of the E-unit 2 are referred to as GGPR's. The GGPR's 4050 are of the same construction as the IGPR's 60 although it is not essential. The construction of the IGPR's 60 is shown in FIG. 4 and it has sixteen general purpose registers 8000–8015. Numeral 70 denotes a GPR write control which receives the outputs of the work register 904, the comparators 904A and 904B and the X/B conflict detector 3 and controls the storing of the operation results of the pre-operation unit 981 and the main operation unit 4030 into the IGPR's 60 and suppresses the stages to prevent an operand register conflict. The construction of the GPR write control 70 is shown in FIG. 6 to be explained later.

Numeral 950 denotes an address control which converts a logical address determined by the address calculation into a physical address for reading out the buffer memory 960 and controls the fetching of the operand stored in the buffer memory 960, and numeral 970 denotes an operand buffer for storing the operand fetched from the operand buffer 960. Numeral 840 denotes a selector for selecting one of the index operands from the IGPR 60 and the operand buffer 970, and numeral 850 denotes a selector for selecting one of the base operands from the IGPR 60 and the operand buffer 970. The pre-operation unit 981 carries out the pre-operation for the operands supplied from the selectors 840 and 850 based on the operation code of the instruction loaded in the register 904 and it can process only the instructions such as A, L and TM (test mode) instructions which frequently appear and which require a relatively small number of circuit components for the processing. The operation result is loaded in the register 982, thence it is stored in the IGPR 60 through a line 50. The main operation unit 4030 in the E-unit 2 of FIG. 2 can carry out the operation for all instructions including M (multiply) and D(divide) instructions which require a large scale arithmetic and logic unit. The operation result of the operation not carried out by the preoperation unit 981 but carried out by the main operation unit 4030 is stored in the IGPR 60 through the line 10 from the register 4020 of the E-unit 2 as will be described later. Numeral 980 denotes an address adder which receives the bits 20–31 (displacement field D) of the instruction loaded in the instruction register 902, the base field data GR(B) from the IGPR 60 and the index field data GR(X) and adds them to produce an operand address. The output of the address adder 980 is supplied to the address control 950.

The operation code, the register and index field and the base and index field are supplied from the instruction queue 903 of the I-unit 1 of FIG. 1 to the E-unit 2 of FIG. 2 through lines 30, 31 and 31A, respectively, and the outputs of the selectors 840 and 850 are supplied to the pre-operation unit 981 and the E-unit 2 through lines 21 and 29, respectively. In the E-unit 2 of FIG. 2, numeral 1000 denotes a register in which the operation code from the instruction queue 903 of the I-unit 1 is loaded, and numeral 1010 (#0 and #1) denotes a control storage for storing microprograms. A microinstruction fetched from the control storage 1010 in accordance with an address specified by the operation code of the instruction loaded in the register 1000 is loaded in a register 1001. If the microinstruction fetched and loaded in the register 1001 is not the last microinstruction for the instruction initially loaded in the register 1000, a portion of the content of the register 1001 is added to the content of the register 1000 through a line 1012 to specify an address of a microinstruction to be next fetched from the control storage 1010 so that the next instruction is loaded to the register 1001 and the microinstructions are sequentially fetched. If the instruction loaded in the register 1001 is the last microinstruction, an end bit (EOP) is loaded in the register 1000 through a line 1012 and the next instruction is loaded in the register 1000 from the instruction queue 903.

Numeral 4000 denotes a register in which the index operand from the selector 840 of the I-unit 1, or the index operand derived from the operation result of the operation unit 4050 or the data from the GGPR 4050 is loaded, and numeral 4010 denotes a register in which the base operand from the selector 850 of the I-unit 1, or the base operand derived from the operation result of the operation unit 4030 or the data from the GGPR 4050 is loaded. The operation result of the operation unit 4030 is stored in a register 4020. The operation unit 4030 carries out the operation on the index and base operands from the registers 4000 and 4010 in accordance with the microinstruction loaded in the register 1001, and the operation result is stored in a register 4040. Numeral 3110 denotes a register for storing the bits 0–15 of the instruction from the instruction queue 903 of the I-unit 1, and numeral 888 denotes an address adder which receives the bits 8–11 (register field) and 12–15 bits (index field) of the instruction loaded in the register 3110 and information ±1 or ±8 to calculate an address. The calculated address is stored in the register 3110. The 8–11 bits of the register 3110 are supplied to the GGPR 4050 as read address information for the GGPR 4050 and the bits 12–15 are supplied, after having been loaded in a register 3110A, to the GGPR 4050 as write address control information for the GGPR 4050. The content of the register 3110A is supplied to the register 9041 and the comparator 904A of the I-unit 1 through a line 11.

The storing of the operation result of the main operation unit 4030 to the GGPR and the IGPR is controlled by the microinstruction. The main operation unit 4030 executes all instructions in the program including the instructions executed by the pre-operation unit 981. The same data as that stored in the IGPR 60 as the operation result of the pre-operation unit 981 is stored in the GGPR 4050 as the operation result of the main operation unit 4030. Numeral 4100 in the E-unit 2 denotes a decoder which determines if the microinstruction loaded in the register 1001 specifies the storing of the operation result into the GGPR 4050. The decoded result is set in a flip-flop 4101 and supplied to the GGPR 4050 as a write enable signal.

Numeral 4200 denotes a decoder which determines if the microinstruction loaded in the register 1001 specifies the storing of the operation result into the IGPR 60. The decoded result is set in a flip-flop 4102 and supplied to the IGPR 60 through a line 100 as a write control signal. Numeral 5000 denotes a flip-flop in which a decision result by the decision circuit 902A for the instruction from the instruction queue 903 is set. The decision result set in the flip-flop 5000 is sent to the GPR write control 70 and the X/B conflict detector 3 of the I-unit 1 through a line 5000A and it is also set in a flip-flop 5010, thence it is sent to the GPR write control 70 and the X/B conflict detector 3 through a line 5010A.

Before describing the detail of the operation of the present embodiment, the characteristic construction and operation of the present embodiment are briefly explained. In the present embodiment, the operation result of the pre-operation unit 981 and the result of the operation which has been carried out by the main operation unit 4030 rather than by the pre-operation unit 981 are both stored in the IGPR 60. Accordingly, in comparison with a case where the operation result of the pre-operation is stored in a separate buffer, the index and base operands to be used for the address calculation are supplied to the address adder from only the IGPR 60 and no selector for selecting the information from the GPR and the buffer is required. In the present embodiment, the write register number for the instruction set in the register 904 and the write register number for the preceding instruction in the program loaded in the register 3110A from the instruction queue 903 through the register 3110 are compared by the comparator 904A, and in the next machine cycle, the write register number for the instruction loaded in the register 904 and the write register number for the preceding instruction loaded in the register 9041 from the register 3110A are compared by the comparator 904B, and the compared results for both comparisons are sent to the GPR write control 70. Signals indicating whether or not the preceding instructions loaded in the register 3110A and then in the register 9041 in two consecutive machine cycles cannot be processed by the pre-operation unit 981, and whether or not the operation results for those instructions by the main operation unit are to be stored in the IGPR 60, are sent to the GPR write control 70 from the flip-flops 5000 and 5010. The GPR write control 70 responds to those signals and produces a stage suppress signal on a line 803A if the write register number for the instruction loaded in the register 904 and the write register number for the preceding instruction loaded in the register 3110A are equal and the operation result for the preceding instruction should be stored in the IGPR 60, or if the write register number for the instruction loaded in the register 904 and the write register address for the preceding instruction loaded in the register 9041 are equal and the operation result for the preceding instruction should be stored in the IGPR 60. By the stage suppress signal, the execution of the stages D, A, L and E for the succeeding instructions in the program loaded in the register 904 is suppressed, and if it is determined from the operation code supplied from the register 904 that the succeeding instruction can be pre-operated and the operation result should be stored in the IGPR 60, the storing of the operation result of the pre-operation unit 981 into the IGPR 60 is inhibited. In this manner, when the operand register conflict occurs, the storing of the operation result for the succeeding instruction into the IGPR 60 is permitted after the storing of the operation result for the preceding instruction into the IGPR 60.

The operation of the instruction execution in the present embodiment is now explained.

D-stage

A plurality of instructions are previously stored in the buffer 900 from the buffer memory 960. Each instruction is loaded to the instruction register 902 by the instruction partitioning circuit 901 prior to the start of the D-stage. If the instruction is of the RX format which generates one operand address from the index address, base address and the displacement, the index register address (X) and the base register address (B) are sent to the IGPR 60 through the lines 53 and 54, respectively, in the D-stage. The data GR(X) and GR(B) read from the IGPR 60 by the index register address X and the base register address B, respectively, and the displacement of the instruction are sent to the address adder 980 where an operand address is calculated. The first two bytes of the instruction (the leftmost one byte being the operation code) in the instruction register 902 are loaded to the instruction queue 903. The decision circuit 902A determines, based on the operation code in the instruction register 902, if the instruction can be processed only by the main operation unit 4030 and the operation result should be stored in the IGPR 60, and the decision result is paired with the first two bytes of the instruction in the instruction register 902 and the pair is stored in the instruction queue 903. If the decision is negative, the decision result is "1", as described before.

A-stage

For the RX format instruction, the operand address calculated by the address adder 980 in the D-stage is converted to a physical address for the buffer memory by the address control 950 in the A-stage, and the operand is fetched from the buffer memory 960 and it is stored in the operand buffer 970. The output of the operand buffer 970 is selected by the selector 840 and supplied to the pre-operation unit 981. In the A-stage, the first two bytes of the instruction from the instruction queue 903 is loaded to the register 904 and the register field of the instruction which represents the address (R1) of the IGPR 60 which stores the other operand to be used by the instruction is sent to the IGPR 60 through the line 55. The operand GR(R1) fetched from the IGPR 60 based on the address R1 is sent to the selector 850 through the line 820, selected by the selector 850 and supplied to the pre-operation unit 981. If the first two bytes of the instruction from the instruction queue 903 are of a format (RR format) which uses the data in two general purpose registers of the IGPR 60 as the operands, the other IGPR address (R2) for the other operand than the address (R1) is sent to the IGPR 60 through the line 56, and the operand GR(R2) read out based on the address R2 is sent to the selector 850 through the line 830 and selected by the selector 850 and supplied to the pre-operation unit 981. A microcode for specifying a start address of a microprogram for the microprogram processing in the subsequent E-stage is sent from the instruction queue 903 to the E-unit 2 through the output line 30. The first byte of the instruction which contains the read and write addresses for the GGPR 4050 is sent to the E-unit 2 through the line 31. The decision result of the decision circuit 902A from the instruction queue, which is used as an IGPR write request signal in the P-stage is sent to the E-unit 2 through the line 31A. The storing of those signals sent to the E-unit 2 into the registers in the E-unit 2 is carried out in the next stage.

L-stage

If the instruction loaded in the register 904 can be operated by the pre-operation unit 981, the operands GR(R1) and GR(R2) read from the IGPR 60 in the A-stage are operated by the pre-operation unit 981 and the operation result is loaded in the register 982. The two operands are also sent to the registers 4000 and 4010 in the E-unit 2 through the lines 20 and 21. The write register address in the bits 8–11 of the instruction loaded in the register 904 is loaded in the register 9040 through the line 800.

In the E-unit 2, the start address of the microprogram sent from the instruction queue 903 through the line 30 in the A-stage is loaded to the address register 1000 and the microinstruction is fetched from the control storage 1010 and supplied to the register 1001. The first byte of the instruction sent from the instruction queue 903 through the line 31 in the A-stage is loaded to the register 3110.

The decision result of the decision circuit 902A sent from the instruction queue 903 through the line 31A in the A-stage is set in the flip-flop 5000.

E-stage

In the I-unit 1, the operation result loaded in the register 982 by the write register address on the line 52 of the register 9040 is stored in the IGPR 60 through the line 50. In the E-unit 2, the operands sent from the selectors 840 and 850 through the lines 20 and 21 in the L-stage are loaded to the work registers 4000 and 4010 and they are operated by the operation unit 4030 under the control of the microinstruction, and the operation result is stored in the register 4040. The write register field (for the RX format instruction, the bits 8–11 of the register 3110 are the write address) which represents the write address in the first byte of the instruction from the instruction queue 903 representing the content of the register 3110 loaded in the L-stage is sent to the comparator 904A of the I-unit 1 through the line 11 and loaded in the register 9041 of the I-unit 1 in the E-stage. The decision result of the decision circuit 902A set in the flip-flop 5000 is set in the flip-flop 5010 in the E-stage and sent to the GPR write control 70 in the I-unit 1 through the line 5010A. The microinstruction fetched in the L-stage is loaded in the register 1001. As explained before, the microprogram instructions are sequentially fetched into the register 1001, and after the microprogram for the instruction loaded in the register 1000 has been completed, the next instruction is loaded in the register 1000 from the instruction queue 903. If the instruction which requires the GGPR write is loaded in the register 1000 and if the microinstruction which requires the storing of the operation result into the GGPR is loaded in the register 1001, the content of the instruction is decoded by the decoder 4100 through the output line 1013 and the decoded result is set in the flip-flop 4101 and sent out through the line 58 as a write enable signal to the GGPR 4050. If the instruction which cannot be operated on by the pre-operation unit 981 is loaded in the register 1000 and if the microinstruction identifying the IGPR write in the microprogram corresponding to the instruction is loaded in the register 1001, the identification information is decoded by the decoder 4200 through the output line 1002 and the decoded result is set in the flip-flop 4102 and sent to the IGPR 60 of the I-unit 1 through the line 100 as the IGPR write signal.

P-stage

In the P-stage, the operation result in the E-unit 2 is loaded in the register 4020 from the register 4040 under the control of the microinstruction and it is sent to the GGPR 4050 through the line 4020A. If the instruction cannot be operated on by the pre-operation unit 981, the operation result is sent to the GGPR 4050 and the output of the register 4020 is sent to the IGPR 60 of the I-unit 1 through line 10 as the data to be stored in the IGPR 60. The data from the register 4020 is stored in the IGPR 60 in response to the IGPR write signal sent from the flip-flop 4102.

The occurrence of the index/base register conflict is detected by the X/B conflict detector 3, which suppresses the D-stage through the line 3A. A detail of the operation will be explained with reference to FIG. 7.

As described above, when the stage suppress signal 803A is "1", the D, A, L and E stages are suppressed. A detail of the operation will be explained with reference to FIG. 10.

The outlines of the operations of the five stages, D, A, L, E and P stages, of the present embodiment equipped with the pre-operation unit have thus been described.

FIG. 4 shows a detail of the IGPR 60 of FIG. 2 which is a characteristic feature of the present invention. The write and read operations of the general purpose registers of the IGPR 60 are now explained with reference to FIG. 4.

As described above, in the D-stage the data in the index register and the base register are read, and in the A-stage the operands R1 and R2 are read. Since the D-stage for the current instruction and the A-stage for the preceding instruction are overlapped in time by the pipeline system, the four registers of the IGPR 60 which contain the data of the index register, the base register, the operand R1 and the operand R2 are simultaneously read out. A detail of the operation is now explained with reference to FIG. 4.

The IGPR 60 includes sixteen general purpose registers 8000–8015 (GPR0–GPR15) outputs of which are connected to multiplexers (MPX) 53A, 53B, 53C and 53D. The MPX 53A selects one of the general purpose registers by the index register address X supplied from the instruction register 902 through the line 53 and sends the content of the selected register to the address adder 980 through the line 800 as the data R(X). Similarly, the MPX 53B selects one of the general purpose registers by the base register address B designated by the instruction register 902 through the line 54 and sends the content of the selected register to the address adder 980 through the line 810 as the data R(B), the GPX 53C selects one of the general purpose registers by the register address R1 supplied from the instruction queue 903 through the line 55 and sends the content of the selected register to the selector 850 through the line 820 as the data R(1), and the MPX 53D selects one of the general purpose registers by the register address R2 supplied from the instruction queue 903 through the line 56 and sends the content of the selected register to the selector 840 through the line 830 as the data R2. In this manner, the contents of the four general purpose registers of the IGPR 60 can be independently read out.

As described above, the operation result for the instruction which can be operated by the pre-operation unit 981 is stored in the IGPR 60 in the E-stage and the operation result for the instruction which cannot be operated by the pre-operation unit 981 is stored in the IGPR 60 in the P-stage.

Since the E-stage for the current instruction and the P-stage for the preceding instruction are overlapped in time by the pipeline system, it is necessary to simultaneously write the data in the general purpose registers of the IGPR 60 in the E-stage and the P-stage. The construction and the operation therefor are now explained. In the P-stage, the write data from register 4020 of the E-unit 2 is sent to the GPR's 8000–8015 through the line 10. Similarly, the write data from the pre-operation unit 981 is sent to the GPR's 8000–8015 through the line 50. The GPR address supplied from the register 3100 of the E-unit 2 through the register 9041 is sent to the decoder 61 shown in FIG. 4 through the line 51 and decoded thereby, and the decoded data is sent to the lines 630–645 through an AND gate which receives the IGPR write signal from the flip-flop 4102 of the E-unit 2. In the E-stage, the GPR address which represents the write address for the operation result of the pre-operation unit 981 is sent to the decoder 62 of FIG. 4 through the line 52 and decoded thereby, and the decoded data is sent to the lines 650– 665 through an AND gate which receives the IGPR write enable signal from the GPR write control 3 through the line 700. The write signal in the P-stage on the line 630 and the write signal in the E-stage on the line 650 are sent to the line 530 through an OR gate to produce a set signal to the GPR 8000. The signals on the lines 631–645 and the signals on the lines 651–665, respectively, are also sent to the lines 531–545, respectively, through OR gates to produce set signals to the GPR's 8001–8015. Whether the data on the line 10 or the line 50 is to be supplied to the GPR 8000 is designated by the signal on the line 630. If the signal on the line 630 is "1", the signal on the line 10 is selected, and if it is "0" the signal on the line 50 is selected. For the GPR's 8001–8015, the input data are selected by the signals on the lines 631–645. In this manner, the data can be simultaneously written in the general purpose registers of the IGPR 60 in the E-stage for the current instruction and the P-stage for the preceding instruction.

Figure 5:
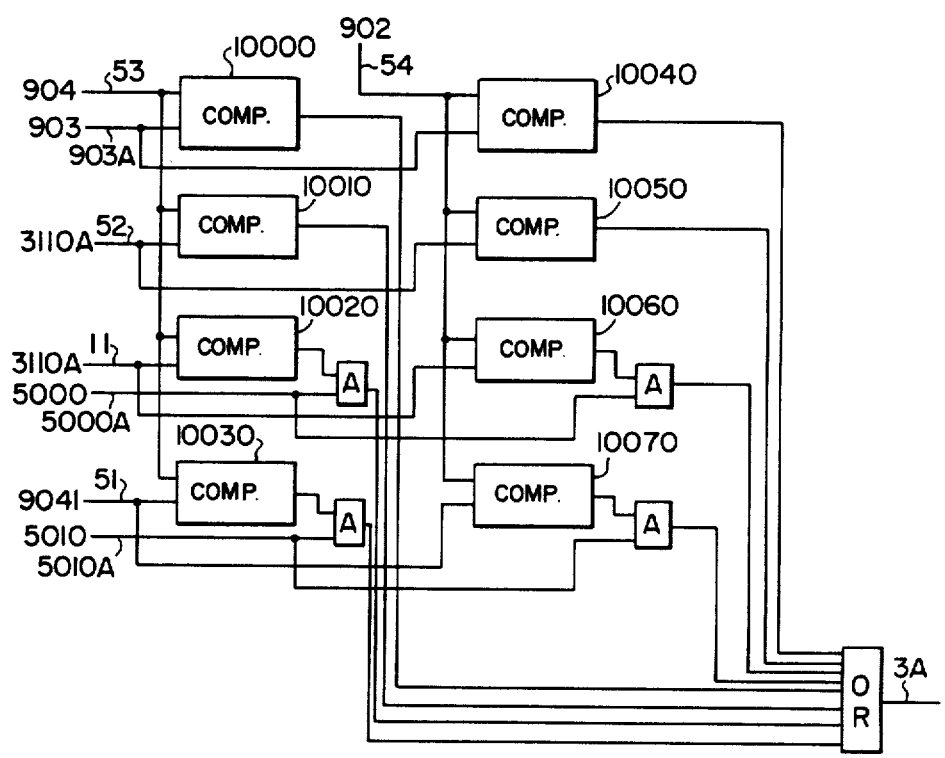
FIG. 5 shows a detail of an X/B conflict detector shown in FIG. 1.
Figure 7:
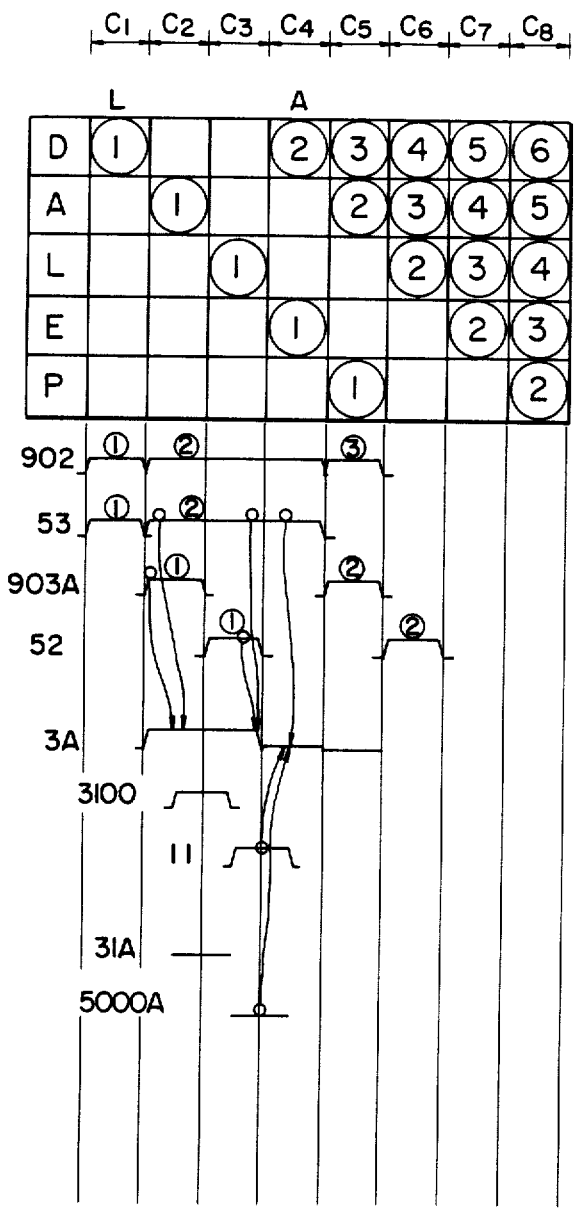
FIG. 7 shows a chart for explaining instruction processing in the first embodiment of the present invention.

The operation when the index/base register conflict occurs is now explained with reference to FIGS. 1, 5 and 7. FIG. 5 shows a detail of the X/B conflict detector 3 in the I-unit 1 and FIG. 7 shows a flow chart for the pipeline therefor. D.A.L.E and P represent the respective stages and an abscissa represent a time in machine cycle unit. Each machine cycle is divided by four clocks, each designated by $T_0$, $T_1$, $T_2$ and $T_3$. In the following description for the instruction, when a machine cycle $C_i$ is for a certain stage, for example, D-stage of the machine cycle, a clock $T_i$ for the machine cycle is designated in combination with the stage such as clock (D, $T_i$). Numbers ①–⑤ in FIG. 7 represent the instruction numbers to be processed. In FIG. 7, ① represents a L(load)-instruction, and ② represents an A (add)-instruction. The write register number R1 for ① and the index register number R2 for ② are equal and hence the index register conflict occurs.

Figure 8:
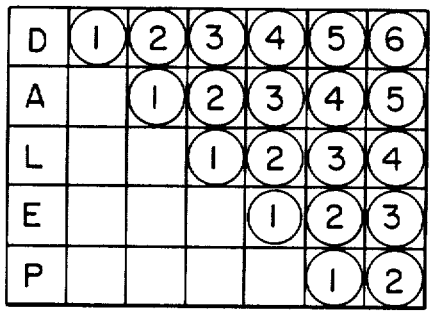
FIG. 8 shows a chart for explaining instruction processing where no index register conflict occurs in a pipelined data processing system.
Figure 9:
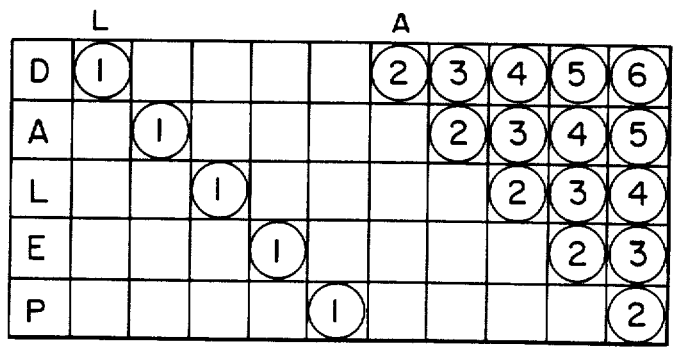
FIG. 9 shows a chart for explaining instruction processing without pre-operation where an index register conflict occurs in the pipelined data processing system.

For the purpose of comparison, FIG. 8 shows a pipeline flow where the index register conflict does not occur and FIG. 9 shows a pipeline flow for the prior art system where the index register conflict occurs and the pre-operation is not carried out.

Since the L-instruction ① can be operated by the pre-operation unit 981, the operation result can be stored in the IGPR 60 in the E-stage. Accordingly, the D-stage for the A-instruction ② can be processed in overlap with the E-stage for the L-instruction ① and the operand address necessary for the A-instruction can be obtained. As a result, in comparison with FIG. 9, the D-stage for the A-instruction 2 can be initiated two cycles earlier.

The operation is described in further detail. The L-instruction ① is loaded in the instruction register 902 at a clock $T_0$(D, $T_0$) in cycle $C_1$. Since the L-instruction ① can be operated by the pre-operation unit 981, the output "0" from the decision circuit 902A is loaded in the instruction queue 903 at a clock $T_0$ (A, $T_0$) in cycle $C_2$. The first two bytes of the instruction register 902 are also loaded in the instruction queue 903 at the clock $T_0$ (A, $T_0$) At a clock $t_0$ of the cycle $C_2$, the A-instruction ② is loaded in the instruction register 902. The index field X and the base field B of the A-instruction ② are sent from the instruction register 902 to the X/B conflict detector 3 through the lines 53 and 54. At the same time, the write register number R1 of the L-instruction ① is sent from the instruction queue 903 to the X/B conflict detector 3 through the line 903A. In the X/B conflict detector 3 which is shown in detail in FIG. 5, the index field of the A-instruction ② from the instruction register 902 and the register number R1 of the L-instruction ① from the instruction queue 903 are compared by a comparator 10000. Since the addresses are equal in the present example, the output of the comparator 10000 passes through an OR gate and renders the D-stage suppress signal 3A to "1". By this signal, the processing in the D-stage for the A-instruction ② at the cycle $C_2$ is suppressed and the update of the instruction register 902 is suppressed.

At the clock $T_2$ (A, $T_2$) in the cycle $C_2$, the first two bytes of the L-instruction ① including the write address R1 are loaded in the register 904. The four bits of the register 904 including the write address R1 are loaded in the register 9040 at a clock $T_0$ (L, $T_0$) in cycle $C_3$.

Since the processing in the D-stage for the A-instruction ② is suppressed and the instruction register 902 is not updated in the cycle $C_2$, the data X and B of the A-instruction ② are sent to the lines 53 and 54 at the clock $T_0$ of the cycle $C_3$. At the same time, the write address R1 of the L-instruction ① is sent from the register 9040 to the line 52. Accordingly, a comparator 10010 of the X/B conflict detector 3 compares the index field of the A-instruction ② from the instruction register 902 on the line 53 and the address R1 of the L-instruction ① from the register 9040 on the line 52. Since the addresses are equal in the present example, an output of the comparator 10010 passes through an OR gate to render the D-stage suppress signal 3A to "1". This signal is sent to a stage control circuit, not shown to suppress the D-stage so that the D-stage for the A-instruction ② in the cycle $C_3$ is suppressed.

At a clock $T_2$ (A, $T_2$) of the cycle $C_2$, the output of the decision circuit 902A representing the IGPR write request in the P-stage is sent to the E-unit 2 through the line 31A and it is set in the flip-flop 5000 at a clock $T_2$ (L, $T_2$) in the cycle $C_3$ and sent to the I-unit 1 through the line 5000A.

At a clock $T_0$ (A, $T_0$) of the cycle $T_2$, the write address R1 of the L-instruction ① is sent to the E-unit 2 through the line 31, and at a clock $T_0$ (L, $T_0$) of the cycle $C_3$, it is loaded in the register 3110 and the bits 8–11 of the register 3110, that is, the address R1 of the L-instruction ①, are loaded in the register 3110A, and at a clock $T_2$ (L, $T_2$) of the cycle $C_3$ they are sent to the I-unit 1 through the line 11.

In the cycle $C_3$, the D-stage for the A-instruction ② is again suppressed and X and B of the A-instruction ② are sent to the lines 53 and 54 at clock $T_0$ of cycle $C_4$.

At the same time, the write address R1 of the L-instruction is sent to the line 11 and the comparator 10020 of the X/B conflict detector 3 compares the register address R1 of the L-instruction from the register 3110A on the line 11 and the index field of the A-instruction from the instruction register 902 on the line 53. In this case, the addresses are equal and the IGPR write request signal supplied from the flip-flop 5000 through the line 5000A in the P-stage is "0". Therefore, the compare result is suppressed by the AND gate and the D-stage suppress signal 3A is "0". Accordingly, the D-stage for the A-instruction ② is processed in the cycle $C_4$.

The L-instruction ① can be operated by the pre-operation unit 981 but if the instruction ① cannot be operated by the pre-operation unit 981 the IGPR write request signal supplied from the flip-flop 5000 in the P-stage is "1" and the D-stage suppress signal 3A is "1" in the cycle $C_4$ so that the operation in the D-stage is suppressed. In the cycle $C_5$, the IGPR write request signal supplied from the flip-flop 5010 through the line 5010A in the P-stage is "1" and the D-stage suppress signal 3A is "1" so that the operation in the D-stage is suppressed. In the cycle $C_6$, the D-stage for the instruction ② is first processed. In this case, the pipeline flow is same as that shown in FIG. 9.

The index register has thus been described in connection with the comparators 10000–10030 as to the base register 54, the addresses are compared by the comparators 10040–10070 and the D-stage suppress signal 3A is rendered to "1" as required in the same manner as for the index register.

In this manner, when the instruction ① can be operated by the pre-operation unit 981, the performance for the index register conflict is improved by two cycles in comparison with a case where the index/base register conflict shown in FIG. 9 does not occur and the pre-operation of FIG. 9 is not carried out.

The method and operation for resolving the problem of the operand register conflict which occurs when the pre-operation unit is used are now explained.

FIG. 6 shows a detail of the GPR write control 70 which is a characteristic feature of the present invention. The operation thereof is explained with reference to FIGS. 10–12.

Figure 10:
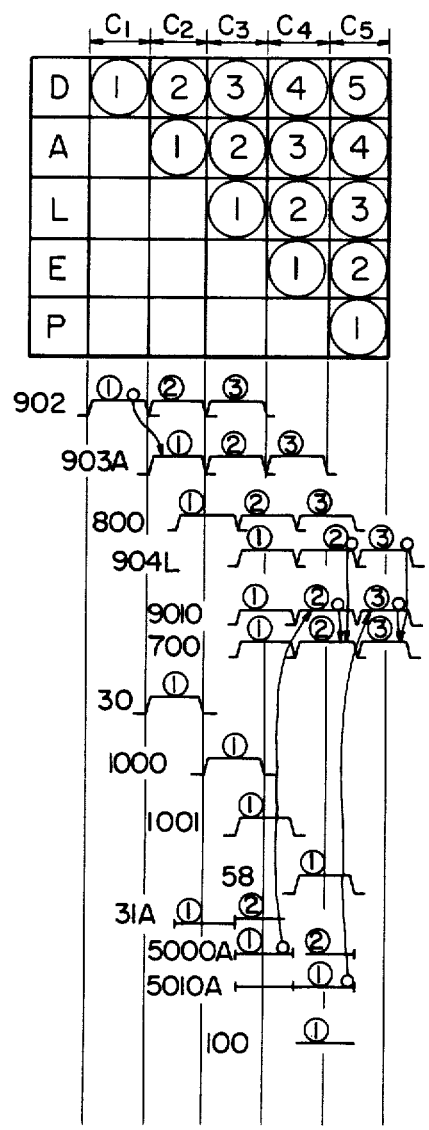
FIG. 10 shows a chart for explaining instruction processing where instructions which can be processed by a pre-operation unit are in series and operation results thereof are to be stored in general purpose registers.

FIG. 10 shows a pipeline flow chart where the instructions (for example, L-instructions) which can be operated by the pre-operation unit 981 and the operation results of which should be stored in the general purpose registers appear successively.

The instructions ①–⑤ are RX instructions for writing in the general purpose registers. Accordingly, the GPR write address is designated by R1.

The instruction ① is loaded in the instruction register 902 at the clock $T_0$ (D, $T_0$) of the cycle $C_1$. Since the instruction ① can be operated by the pre-operation unit 981, the decision circuit 902A produces the output "0" and this output and the first two bytes of the instruction are loaded in the instruction queue 903 at the clock $T_0$ (A, $T_0$) of the cycle $C_2$. The data including the write address R1, loaded at the clock $T_0$ (A, $T_0$) of the cycle $C_2$ is loaded to the register 904 through the line 903A at the clock $T_2$ (A, $T_2$) of the cycle $C_2$. The operation code of the register 904 is supplied to the GPR write control 70 shown in detail in FIG. 6 through the line 804. The GPR write decision circuit 9900 in FIG. 6 determined that the instruction ① can be operated by the pre-operation unit 981 and the GPR writing is requested and produces a "1" output on the line 9901. This "1" output is set in the flip-flop 9902 at the clock $T_2$ of the cycle $C_3$.

The output of the decision circuit 902A on the output line 3A which was set to "0" at the clock $T_2$ (A, $T_2$) of the cycle $C_2$ is set in the flip-flop 5000 at the clock $T_2$ (L, $T_2$) of the cycle $C_3$ as shown in FIG. 10 and the output is produced on the line 5000A. It is also set in the flip-flop 5010 at the clock $T_2$ of the cycle $C_4$ to produce a "0" output on the line 5010A.

The microinstruction address supplied from the instruction queue 903 through the line 30 at the clock $T_0$ (A, $T_2$) of the cycle $C_2$ is loaded in the register 1000 of the E-unit 2 at the clock $T_0$ (L, $T_0$) of the cycle $C_3$. Then, the microinstruction is fetched from the control storage 1010 and it is loaded in the register 1001 at the clock $T_2$ (L, $T_2$) of the cycle $C_3$. Since the instruction ① requests the GPR writing, the GPR write instruction is stored in the register 1001 and it is decoded by the decoder 4100 and the decoded output is set in the flip-flop 4101 at the clock $T_2$ (E, $T_2$) of the cycle $C_4$ so that a "1" output is produced on the output line 58. This is the write instruction to the GGPR 4050. Since the writing into the IGPR 60 is not required in the P-stage for the instruction ①, the IGPR write instruction is not supplied from the register 1001 to the decoder 4200. Accordingly, "0" is set in the flip-flop 4102 at the clock $T_2$ of the cycle $C_4$ and "0" output is produced on the line 100. This means that the instruction can be operated by the pre-operation unit 981 and the IGPR write signal is not necessary in this cycle because the writing of the IGPR 60 has been completed in the cycle $C_3$ (E-stage). The operation of FIG. 6 is further explained with respect to the instruction ②.

The instruction ② loaded in the instruction register 902 at the clock $T_0$ (D, $T_0$) of the cycle $C_2$. At the clock $T_0$ (A, $T_0$) of the cycle $C_3$, the two bytes of the instruction ② are read out from the instruction queue 903 to the line 903A and it is loaded in the register 904 at the clock $T_2$ (A, $T_2$) of the cycle $C_3$ and the write register address is supplied to the line 800 from the register 904 and the operation code of the register 904 is supplied to the GPR write control 70 shown in FIG. 6 through the output line 804. The GPR write decision circuit 9900 shown in FIG. 6 determines that the instruction ② can be operated by the pre-operation unit 981 and requests the GPR writing, and "1" output is produced on the line 9901. This signal is set in the flip-flop 9902 at the clock $T_2$ (L, $T_2$) of the cycle $C_4$ so that "0" output is produced on the line 904L. This output indicates that the preceding instruction ① can be operated by the pre-operation unit 981 and the instruction ① can be pre-operated at the clock $T_2$ (A, $T_2$) of the cycle $C_3$. Since the signal on the line 5000A from the flip-flop 5000 is "0" and the instruction preceding to the instruction ① can be pre-operated, the signal on the line 5010A from the flip-flop 5010 is also "0" and "0" output is produced on the line 9000 through the AND gate and the OR gate so that the flip-flop 9001 is not set at the clock $T_2$ (L, $T_2$) of the cycle $C_4$ and the inverted output 9010 of the flip-flop 9001 is "1". The signal on the line 904L from the flip-flop 9902 and the signal on the line 9010 from the inverted output of the flip-flop 9001 are ANDed to produce the IGPR write enable signal 700. Since the flip-flop 9001 is not set, the stage suppress signal on the line 803A is "0". As to the instruction ③, like the instruction ②, "1" is set in the flip-flop 9902 at the clock $T_2$ (L, $T_2$) of the cycle $C_5$ and the "1" output is produced on the line 904L. At the clock $T_2$ of the cycle $C_4$, the signal on the line 5000A from the flip-flop 5000 is "0" and the signal on the line 5010A from the flip-flop 5010 is "0". Accordingly, "0" output is produced on the line 9000 through the AND gate and the OR gate and the flip-flop 9001 is not set at the clock $T_2$ of the cycle $C_5$ so that the inverted output of the flip-flop 9001 is "1". As a result, the signal on the line 904L from the flip-flop 9902 and the signal on the line 9010 from the inverted output of the flip-flop 9001 are ANDed to produce the IGPR write signal on the line 700. This signal is sent to the IGPR 60.

In this manner, where the pre-operable instructions appear successively, the stage suppress signal on the line 904A is "0" and the pipeline flows without disturbance. The signal on the line 803A is sent to the stage control circuit, not shown, to suppress the D, A, L and E-stages for the succeeding instructions.

Figure 11:
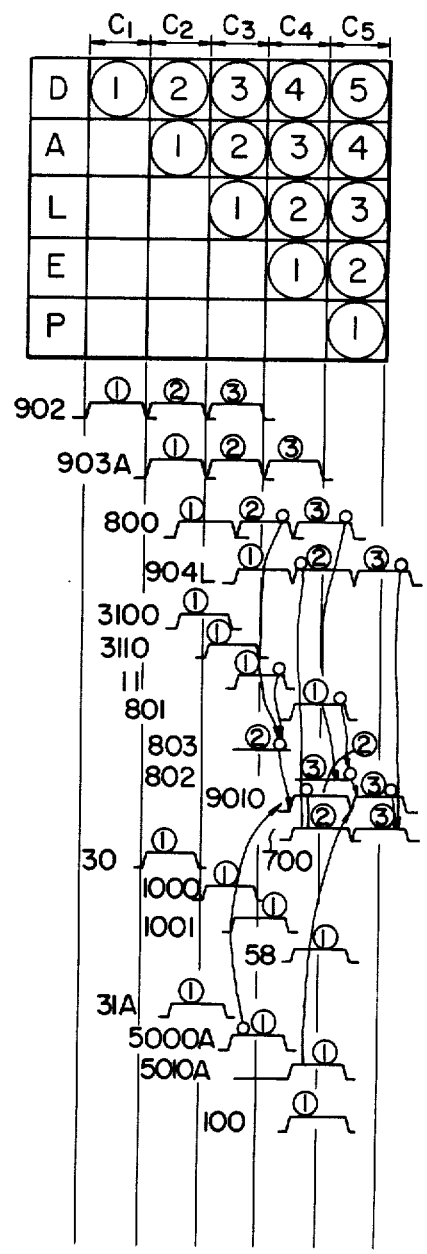
FIG. 11 shows a chart for explaining one instruction processing where an instruction which cannot be pre-processed is followed by instructions which can be pre-processed.

FIG. 11 shows a pipeline flow chart where the instruction ① cannot be operated by the pre-operation unit 981 and the instructions ②, ③, ④ and ⑤ can be pre-operated and the GPR write addresses of the instructions ② and ③ are different from the GPR write address of the instruction ①. The operation of the instruction ① is identical to that of the instruction ① of FIG. 10 with the following exception. Since the instruction ① cannot be operated by the pre-operation unit 981, it is determined by the decision circuit 902A, which produces "1" output. This output is loaded in the instruction queue 903 at the clock $T_0$ of the cycle $C_2$. This signal is supplied to the flip-flop 5000 of the E-unit 2 through the output line 31A of the instruction queue 903 and operated in the same manner as FIG. 10. As a result, "1" is set in the flip-flop 5000 at the clock $T_2$ (L, $T_2$) of the cycle $C_3$ to produce "1" output on the output line 5000A. Unlike the case of FIG. 8, the writing in the IGPR 60 is necessary in the P-stage for the instruction ①. The register 1001 which was loaded at the clock $T_2$ (L, $T_2$) of the cycle $C_3$ holds the IGPR write instruction. This signal is decoded by the decoder 4200 through the line 1002 and the decoded signal is set in the flip-flop 4102 at the clock $T_2$ (E, $T_2$) of the cycle $C_4$ so that "1" output is supplied from the flip-flop 4102 to the I-unit 1 through the line 100 as the IGPR write signal.

The feature of the present invention is further described in conjunction with the operation of the instruction ②. Unlike the instruction ①, the instruction ② can be operated by the pre-operation unit 981 and the operation is identical to that of FIG. 10 with the following exception. The write register address of the instruction loaded in the register 967 at the clock $T_2$ of the cycle $C_3$ is compared with the write register address of the instruction ① loaded in the register 3110A of the E-unit 2 at the same time, by the comparator 904A. Since those addresses are not equal as described above, the comparator 904A produces "0" signal on the line 803. At this time, "1" output is produced on the line 5000A of the flip-flop 5000, but since the signal on the line 803 from the comparator 904A is "0", one of the AND gates in FIG. 6 is not opened. Since the signal on the line 5010A from the flip-flop 5010 is "0" (as will be apparent from FIG. 7 because the instruction preceding to the instruction ① can be operated by the pre-operation unit 981), the other AND gate is also not opened and the flip-flop 9001 is not set at the clock $T_2$ of the cycle $C_4$ and "1" is produced at the inverted output of the flip-flop 9001. Thereafter, the AND gate which AND's the signal on the line 904L from the flip-flop 9902 and the signal on the line 9010 from the inverted output of the flip-flop 9001 is opened so that the IGPR write signal is produced on the line 700. Accordingly, the stage suppress signal on the line 803A is "0".

As to the instruction ③, the write register address on the line 800 loaded in the register 904 at the clock $T_2$ of the cycle $C_4$ is compared with the register write address of the instruction ① the line 801 loaded in the register 9041 at the same time, by the comparator 904B. Since those addresses are not equal as described above, the comparator 904B produces "0" signal on the line 802. Since the signal on the line 5010A from the flip-flop 5010 is "1" at this time but the signal on the line 802 is "0", one of the AND gates in FIG. 6 is not opened. Since the signal on the line 5000A from the flip-flop 5000 is "0" (because the instruction ② can be operated by the pre-operation unit 981), the other AND gate is also not opened. Accordingly, the flip-flop 9001 is not set at the clock $T_2$ of the cycle $C_5$ and "1" signal is produced at the inverted output of the flip-flop 9001. Thereafter, the AND gate which AND's the signal on the line 904L and the signal on the line 9010 is opened and the IGPR write enable signal is produced on the line 700. At the some time, the stage suppress signal on the line 803A becomes "0". In this manner, the pipeline flows as shown in FIG. 8.

Figure 12:
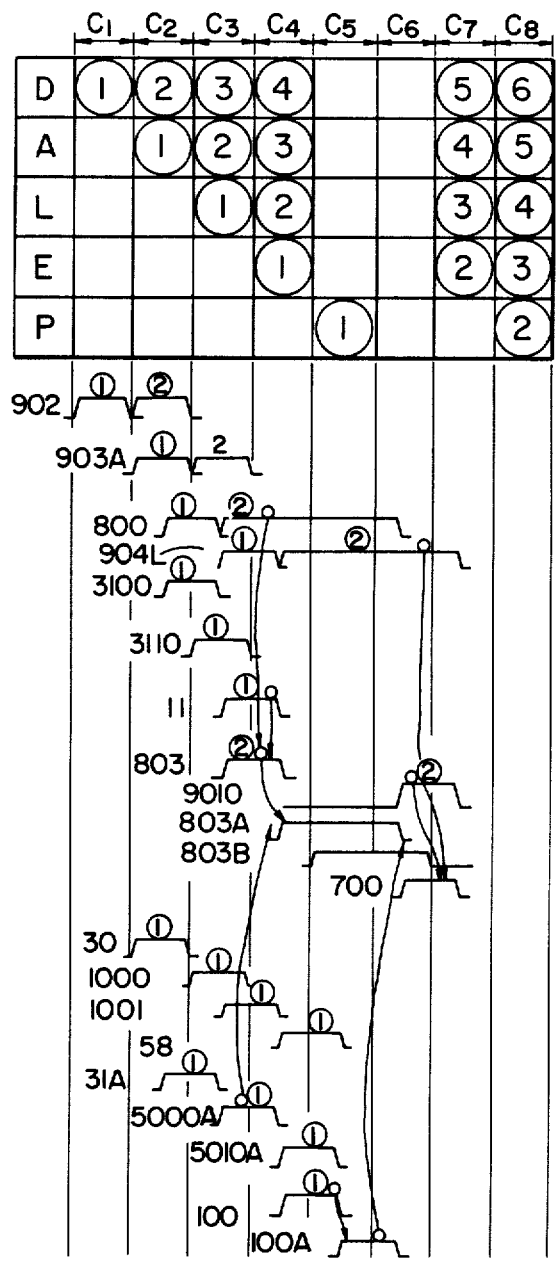
FIG. 12 shows a chart for explaining another instruction processing where an instruction which can be pre-processed is followed by instructions which can be pre-processed.

FIG. 12 shows a pipeline flow chart where the instruction ① cannot be operated by the pre-operation unit 981 and the instructions ②, ③, ④ and ⑤ can be pre-operated and the GPR write addresses of the instruction ① and ② equal. The operation of the instruction ① is the same as that of the instruction ① of FIG. 11 and hence it is not explained here. The operation of the instruction ② is the same as that of FIG. 10 with the following exception. The write register address of the instruction loaded in the register 904 at the clock $T_4$ of the cycle $C_3$ is compared with the write register address of the instruction ① loaded in the register 3110A of the E-unit 2 at the same time, by the comparator 904A. Unlike the case of FIG. 11, those addresses are equal in this case and the comparator 904A produces "1" output on the line 803. Since "1" signal is produced on the line 5000A of the flip-flop 5000 at this time (because the instruction ① cannot be operated by the pre-operation unit 981), the upper AND gate in FIG. 6 is opened and the flip-flop 9001 is set at the clock $T_2$ of the cycle $C_4$ and "1" stage suppress signal is produced on the line 803A. Accordingly, "0" output is produced on the line 9010 from the inverted output of the flip-flop 9001. At the clock $T_2$ of the cycle $C_4$, "1" output is produced on the line 904L from the flip-flop 9902 (because the instruction 2 can be operated by the pre-operation unit 981) but the AND gate is not opened and the IGPR write suppress signal "0" is produced on the line 700. When the IGPR write signal "1" is produced on the line 100 at the clock $T_2$ of the cycle $C_4$, this "1" signal is set in the flip-flop 10000 of FIG. 6 at the clock $T_2$ of the cycle $C_5$ and the output is produced on the line 100A. In response to this signal, the flip-flop 9001 is reset at the clock $T_2$ of the cycle $C_6$ and the stage suppress signal on the line 803A is reset to "0". Accordingly, "1" signal is produced at the inverted output of the flip-flop 9001. Since the stage is supressed during this period and "1" signal is produced on the line 904L from the flip-flop 9902, the AND gate is opened and the IGPR write enable signal "1" is produced on the line 700. While the stage suppress signal on the line 803A is "1", the respective stages are suppressed. This manner is shown in the cycles $C_5$ and $C_6$ of FIG. 10. The logic of the stage suppression is well known to those skilled in the art and hence it is not illustrated. Thus, the IGPR write of the instruction ② is delayed until the IGPR write of the instruction ① is completed and hence the IGPR write sequence to the same address is properly maintained.

In FIG. 12, the GPR write addresses of the instruction ① and ② are unequal. The operation where the GPR write addresses of the instructions ① and ③ are equal can be readily understood from FIG. 12.

Figure 13:
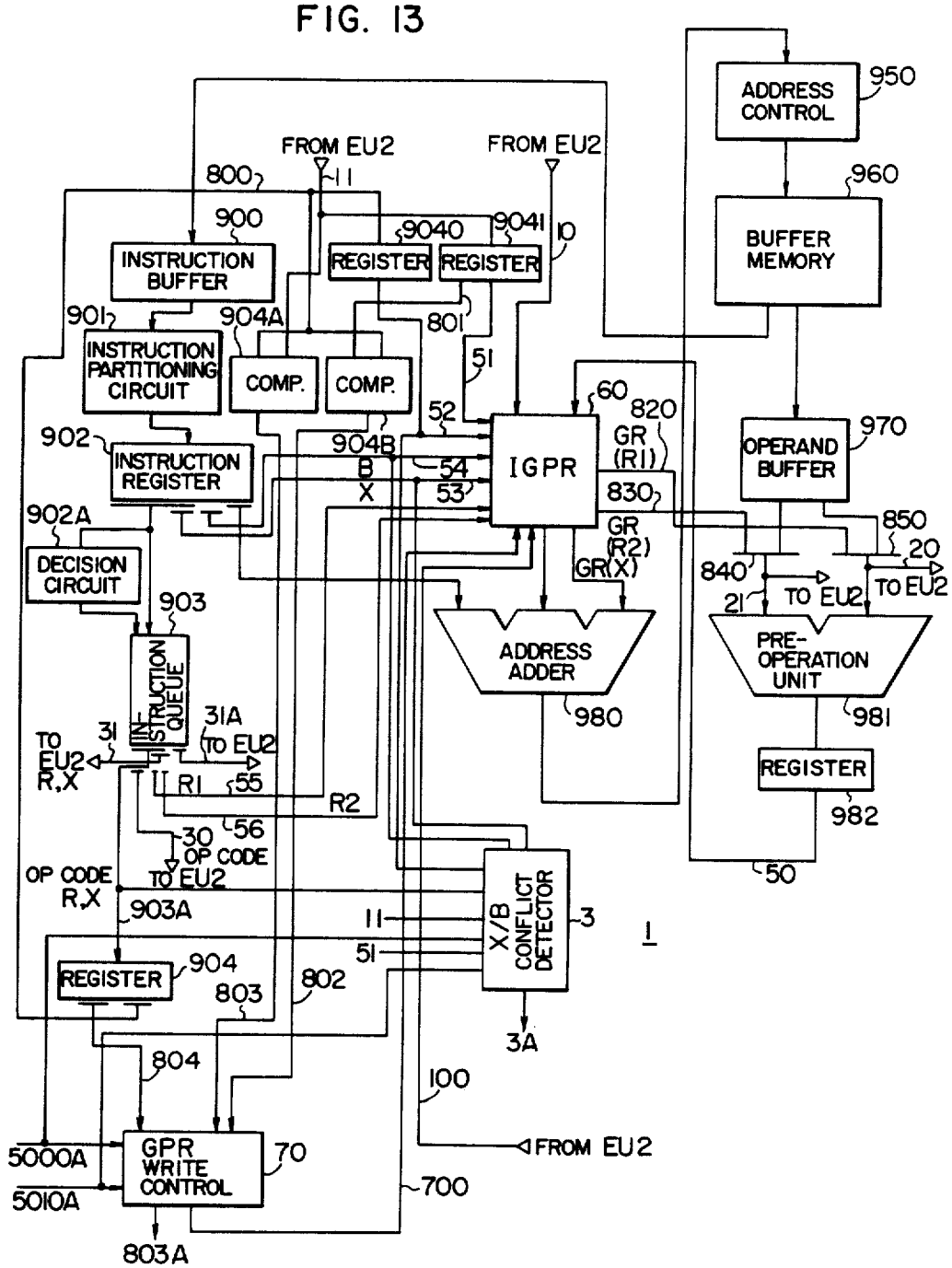
FIG. 13 shows a detail of an instruction unit in other embodiment of the present invention.

In the method described above, the write addresses are compared and if they are not equal, the writing is permitted and if they are equal the writing is delayed by delaying the GPR write signal from the pre-operation unit 981. In an alternative method, if the addresses are equal, the operation by the pre-operation unit 981 is given up even if the instruction can be operated by the pre-operation unit 981 and it is operated by the main operation unit 4030. In one embodiment for this alternative method, the instruction unit of FIG. 1 is replaced by that of FIG. 13, the execution unit of FIG. 2 is replaced by that of FIG. 14 and the GPR write control of FIG. 6 is replaced by that of FIG. 15.

Only the differences from FIGS. 1 to 12 are described below.

Figure 15:
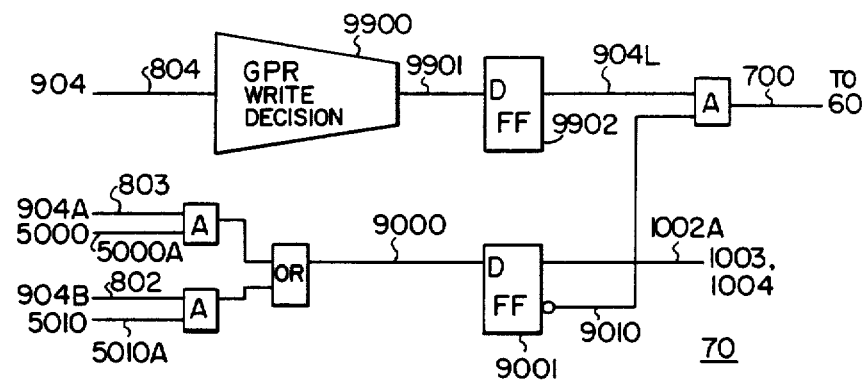
FIG. 15 shows a detail of a general purpose register write control shown in FIG. 13.

In the GPR write control of FIG. 15, the IGPR write signal 100 is isolated from the input and the line 803A for carrying the stage suppress signal is blocked. Instead, the IGPR write request signal from the main operation unit 4030 is supplied to the line 1002A.

Figure 14:
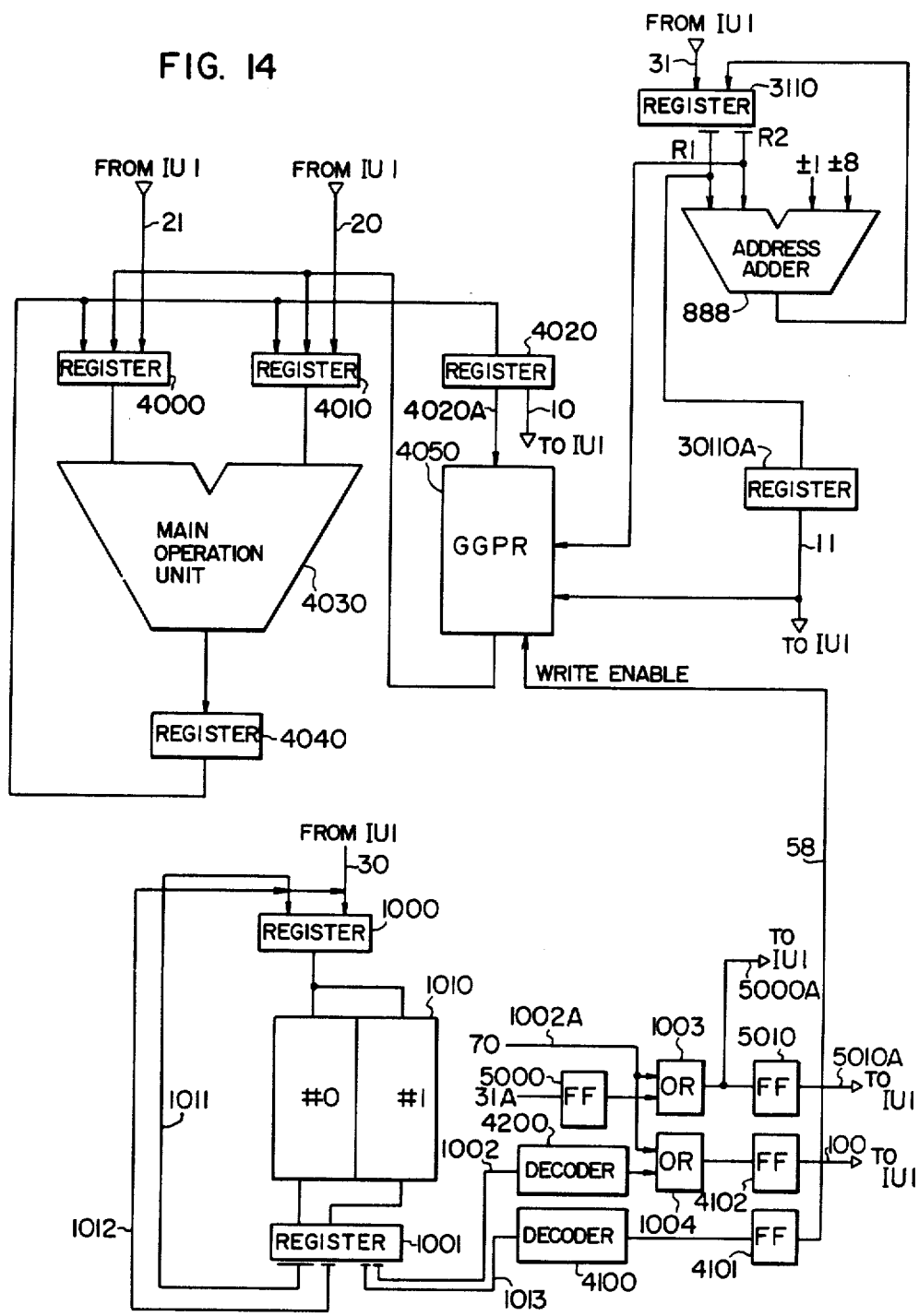
FIG. 14 shows a detail of an execution unit in the other embodiment of the present invention.

In FIG. 14, the signal on the line 1002A and the output from the flip-flop 5000 is ORed and the output thereof is supplied to the line 5000A, and the output of the OR gate is set in the flip-flop 5010.

The above operation is same as that of FIGS. 10 and 11 and hence it is not explained here. The difference of the operation corresponding to FIG. 12 from that of FIG. 12 is explained below.

In FIG. 12, the instruction ① cannot be operated by the pre-operation unit 981 and the instructions ②, ③, ④ and ⑤ can be pre-operated and the GPR write addresses of the instructions ① and ② are equal.

The operation of the instruction ① is identical to that of the instruction ① of FIG. 12. The operation of the instruction ② is explained below.

The write register address of the instruction ② loaded in the register 904 at the clock $T_2$ of the cycle $C_3$ is compared with the write register address of the instruction ① loaded in the register 3110A of the E-unit②at the same time, by the comparator 904, and if those addresses are equal, the flip-flop 9001 is set at the clock $T_2$ of the cycle $C_4$ instead of producing the stage suppress signal on the line 803A in FIG. 6, to supply the IGPR write request signal from the main operation unit to the line 1002A.

Like in FIG. 6, the IGPR write is not allowed at the clock $T_2$ of the cycle $C_4$ and "0" signal is produced on the line 700.

In FIG. 14, unlike in FIG. 2, in order to operate the instruction ② by the main-operation unit 4030, the output from the flip-flop 5000 and the signal on the line 1002A are ORed by the OR gate 1003 at the clock $T_2$ of the cycle $C_4$ and the IGPR write signal from the main operation unit is supplied to the line 500A. The output of the OR gate 1003 is set in the flip-flop 5010. At the same time, the output of the decoder 4200 and the signal on the line 1002A are ORed by the OR gate 1004 to set the flip-flop 4102. In this manner, the instruction 2 is regarded as the instruction which cannot be operated by the pre-operation unit 981.

Accordingly, the IGPR write signal "1" of the instruction ① is produced on the line 100 at the clock $T_2$ of the cycle $C_4$ and the IGPR write signal "1" of the instruction ② is produced on the line 100 at the clock $T_2$ of the cycle $C_5$. In this manner, the writing is delayed without the stage suppress signal.

Figure 17:
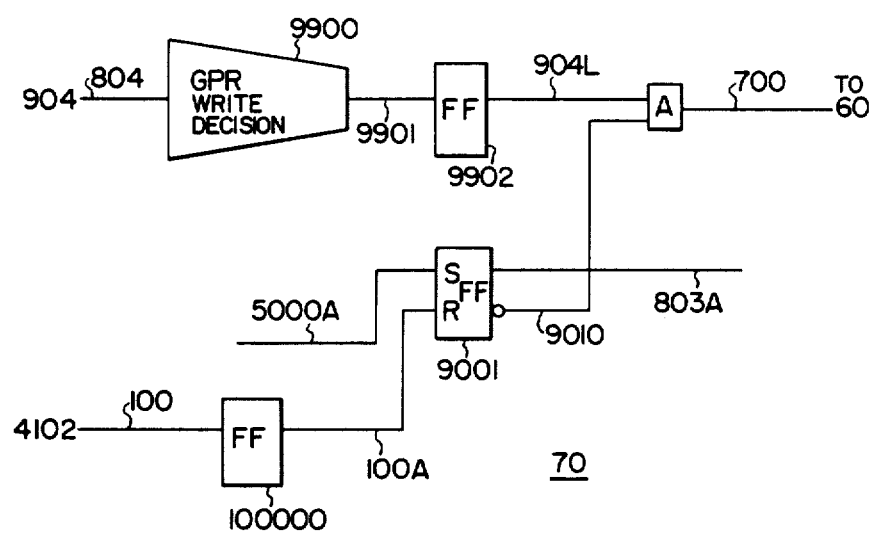
FIG. 17 shows a detail of a general purpose register write control shown in FIG. 16.
Figure 16:
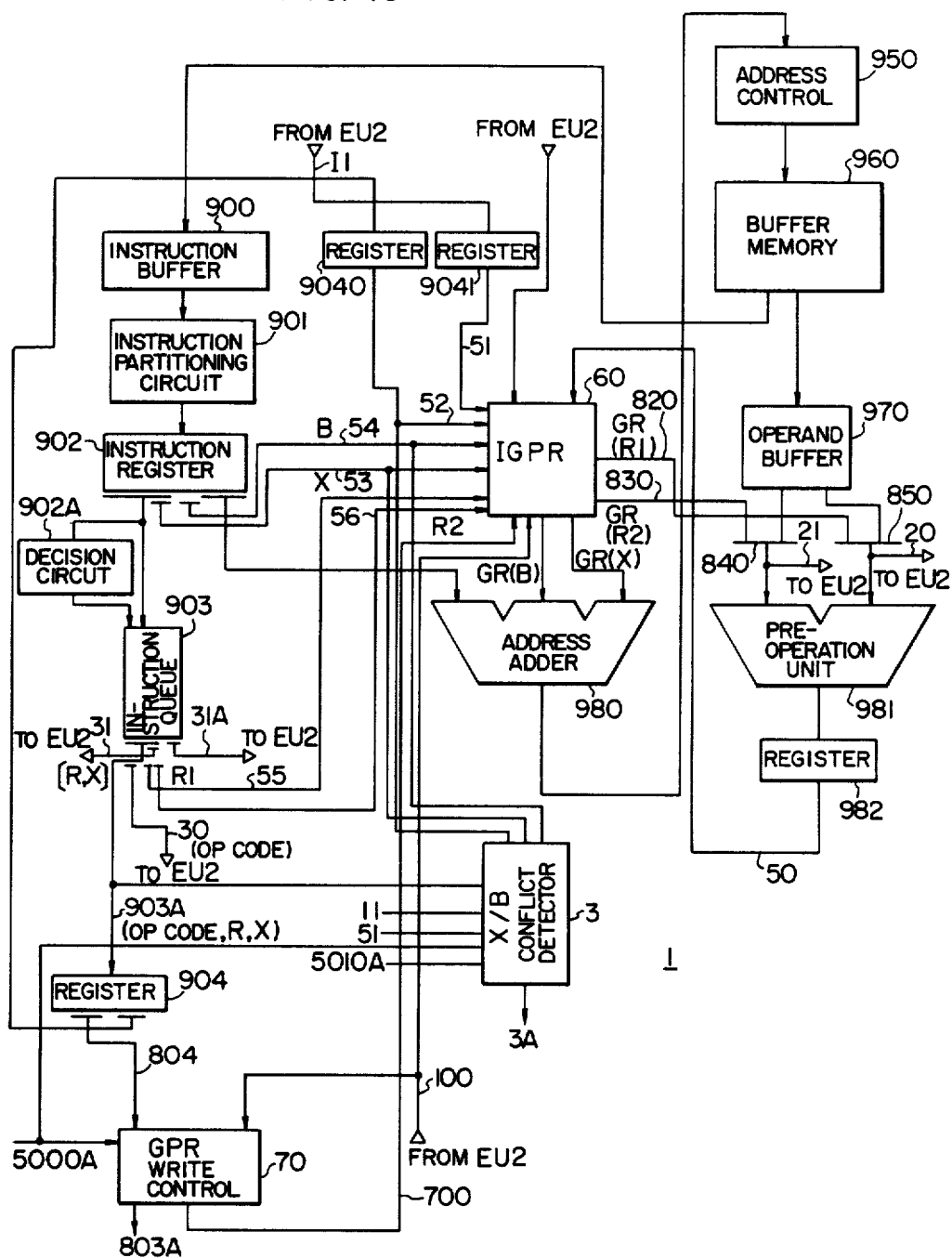
FIG. 16 shows a detail of an instruction unit in a further embodiment of the present invention.
Figure 18:
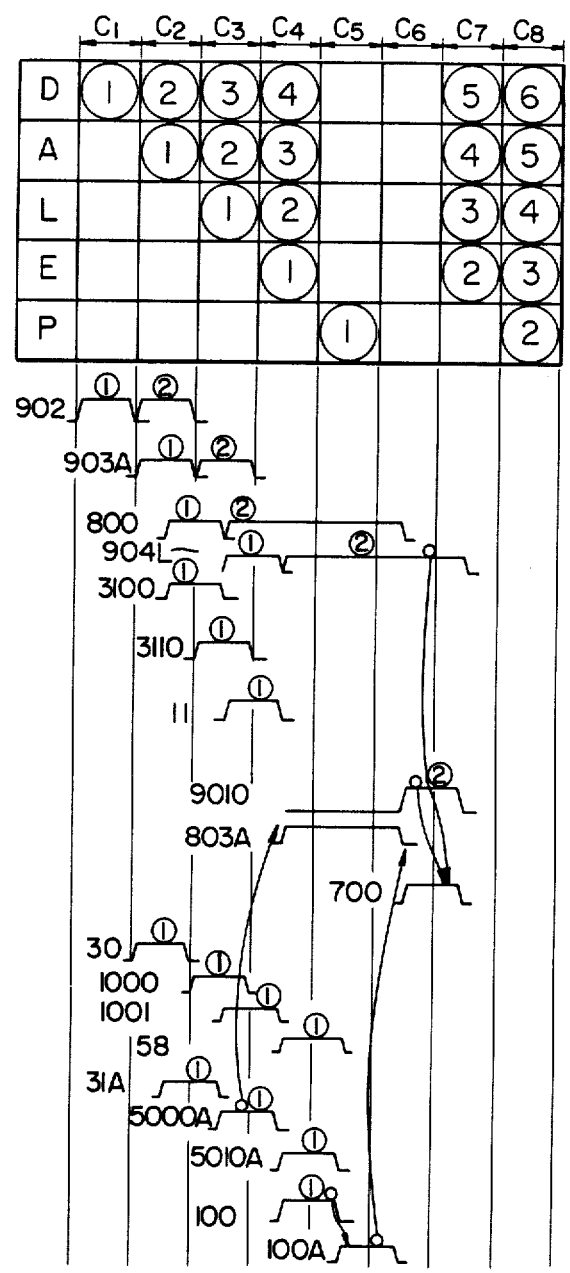
FIG. 18 shows a chart for explaining instruction execution in FIG. 13.

In the method described above, the write addresses are compared and if they are not equal, the writing is permitted, and if they are equal, the writing is delayed. In an alternative method, no comparison is made and the writing is unconditionally delayed. An embodiment thereof is shown in FIGS. 16, 17 and 18. Only the differences from FIGS. 1 to 12 are explained.

FIG. 16 shows a detail of the I-unit 1 which corresponds to that of FIG. 1. The comparators 904A and 904B of FIG. 1 are not necessary and they are omitted, and the inputs to the GPR write control 70 are only those on the lines 5000A, 804 and 100 from the flip-flop 5000, the register 904 and the flip-flop 4102 of the E-unit 2, respectively.

The execution unit and the GPR's of the third embodiment are identical to those of the first embodiment shown in FIGS. 3 and 4, respectively. A further detail of the GPR write control which is a characteristic feature of the present embodiment is shown in FIG. 17. It corresponds to FIG. 6 in the first embodiment. The operation is explained with reference to FIG. 18. The instruction ① cannot be operated by the pre-operation unit 981 and the instructions ②, ③, ④ and ⑤ can be pre-operated. It includes the both cases of FIGS. 11 and 12 of the first embodiment. In the present embodiment, unlike the first embodiment, whether the GPR write addresses of the instructions ② and ③ are not equal or equal to the GPR write address of the instruction ①, the operation is the same.

The operation of FIG. 18 is similar to that of FIG. 12 described above. Only the difference from the operation of FIG. 12 is explained below. The operation of the instruction ① is same as that of the instruction ① in FIG. 12. The operation of the instruction ② is similar to that in FIG. 12 with the following exception. The write register address of the instruction loaded in the register 914 at the clock $T_2$ of the cycle $C_3$ is not compared with the write register address of the instruction loaded in the register 3110A of the E-unit 2 at the same time. As explained above, since the "1" output is produced at this time on the line 5000A from the flip-flop 5000A (because the instruction ① can not be operated by the pre-operation unit 981), the flip-flop 9001 in FIG. 17 is set and the stage suppress signal "1" is produced on the line 803A. The subsequent operation is identical to that in FIG. 12. In the present embodiment, the flip-flop 9001 is set only by the signal on the line 5000A from the flip-flop 5000 without comparing the addresses. As a result, the circuit of the GPR write control 70 is simplified.

From the above two embodiments, where the IGPR 60 can be written from either the E-unit 2 or the I-unit 1, the same result as that which would be obtained in the data processing system which processes the instructions serially can be achieved.

In the instruction format shown in FIG. 3, since both the write register address and the read register addresses are designated by R, the operation is the same even if the write register address of the preceding instruction and the read register address of the succeeding instruction are equal.

In another instruction format, for example, an RR format instruction, a read register address field is included in addition to a write register address field. By handling the read register address field in the same manner as the write register address field of the embodiments of the present invention and comparing it with the write register address of the preceding instruction, the present invention can be readily practiced.

What is claimed is:

1. In a data processing system for executing each of a plurality of instructions in a plurality of stages in a pipeline mode, the improvement comprising:

storage means for holding operand data signals;
a plurality of first register means;
decode means for sequentially decoding a plurality of instructions, including decision means for determining from each decoded instruction whether or not the decoded instruction is an instruction of a first type, means connected to said first register means and said storage means for producing an address of said storage means so as to fetch an operand data signal to be used in the execution of the decoded instruction by using the content of at least one of said first register means designated by the decoded instruction, and conflict detect means connected to said decode means for detecting whether or not there is a preceding instruction under execution which requires writing of a result of execution thereof into said one of the first register means and means responsive to said conflict detect means for controlling said address producing means to postpone the address generation until the writing of the result of execution of said preceding instruction is completed;

first operation means connected to said decode means for executing sequentially all of said decoded instructions and for writing each result of execution of said decoded instructions other than said first type of the decoded instructions into one of said plurality of first register means designated by the instruction being executed;

second operation means connected to said decode means and operable in parallel with said first operation means for executing sequentially only said first type of the decoded instructions and for writing each result of execution into one of said first register means designated by the instruction being executed, including means for executing each of said first type of said decoded instructions before each of said first type of said decoded instructions are executed by said first operation means; and means connected to said first register means for producing addresses to be used in the execution of decoded instructions by using the contents of the first register means.

2. A data processing system according to claim 1, wherein said system further comprises detecting means for indicating when coincidence exists between a register into which the result of execution of a preceding instruction by said first operation means is to be written and a register into which the result of execution of a succeeding instruction by said second operation means is to be written, and delay means responsive to said detecting means for delaying writing of the result of execution by said second operation means until after the writing of the result of execution by said first operation means.

3. In a data processing system for executing each of a plurality of instructions in a plurality of stages in a pipeline mode, the improvement comprising:

means for sequentially decoding instructions to produce data necessary for execution of the instructions in the respective stages;

first operation means capable of carrying out all operations required by said instructions for said data processing system;

second operation means capable of carrying out only those operations required by certain ones of said instructions;

means for storing data produced by executing the instructions;

control means for controlling the execution of the instructions, said control means including means for discriminating the instructions which are capable of execution by said second operation means, for causing said second operation means to execute the discriminated instructions and for storing the data produced by said second operation means in said store means, and means for determining whether an instruction which is capable of execution by said first operation means is capable of execution by said second operation means, and means responsive to an instruction not being capable of execution by said second operation means for storing the data produced by said first operation means into said store means.

4. A data processing system according to claim 3, wherein said control means includes first means for storing the data produced by said second operation means into said store means after the data produced upon execution of an instruction by said first operation means has been stored in said store means when said instruction is capable of executon by only said first operation means.

5. A data processing system according to claim 4, wherein said first means comprises means for storing the data produced by said second operation means into said store means after the data produced by said first operation means has been stored in said store means only when a storage address in said store means for the data produced by said first operation means and a storage address in said store means for the data produced by said second operation means are the same.

6. In data processing system for executing instructions each in a plurality of stages in a pipeline mode, the improvement comprising:

storage means for holding operand data signals;

a group of first registers;

a group of second registers each corresponding to one of said first registers;

decode means for sequentially decoding instructions, said decode means including decision means for determining whether or not an operation required by an applied instruction belongs to a partial group of operations selected from a predetermined group of operations, address means connected to said first registers and responsive to an instruction requiring access to said storage means for generating an address of a first operand data signal held thereby based upon at least one data signal held by at least one of said first registers designated by the instruction and for fetching the first operand data signal from said storage means, and conflict detect means for detecting whether or not there is a preceding instruction under execution which requires writing of a result of execution thereof into the one of said first registers and for controlling said address means to postpone the address generation until the writing is completed, if the result of detection is affirmative;

first operation means connected to said data fetch means for performing one of the partial group of operations as requested by the decoded instruction, on the first operand data signal or a second operand data signal held by one of the first registers designated by the decoded instruction, when the required operation belongs to the partial group of operations;

second operation means, connected to said data fetch means and operable in parallel to said first operation means, for performing all of the predetermined group of operations as requested by the decoded instruction on the first operand data signal or an operand data signal held by one of the second registers corresponding to one of the first registers designated by the decoded instruction, irrespective of whether or not said operation belongs to the partial group of operations; and control means, connected to said decode means and said first and second registers, for controlling execution of the decoded instruction so that an output data signal of said first operation means and an output data signal of said second operation means are respectively written into one of said first registers and into a corresponding one of said second registers when the operation required by the decoded instruction belongs to the partial group of operations, and so that the output data signal of the second operation means is written into one of said first registers and a corresponding one of said second registers when the required operation does not belong to the partial group of operations.

7. A data processing system according to claim 6, wherein said control means further includes means connected to said decode means for controlling execution by said first operation means of a succeeding decoded instruction requiring a first operation belonging to the partial group of operations, so that the first operation is not executed by said first operation means and so that an output data signal provided from said second operation means for the succeeding decoded instruction is written in one of said first registers and in a corresponding one of said second registers, when there is a preceding decoded instruction under execution by said second operation means which requires a second operation not belonging to the partial group of operations but belonging to the predetermined group of operations and which designates the same register number for storage of an output data signal of the second operation as a register number designated by the succeeding decoded instruction for storage of an output data signal of the first operation.

8. A data processing system according to claim 6, wherein said control means further includes first means for controlling execution by said first operation means of a succeeding decoded instruction which requires a first operation belonging to the partial group of operations when there is a preceding decoded instruction under execution by said second operation means which requires a second operation not belonging to the partial group of operations but belonging to the predetermined group of operations, so that an output data signal provided from said first operation means for the succeeding decoded instruction is written into one of said first registers after an output data signal provided from said second operation means for the preceding decoded instruction is written into one of said first registers.

9. A data processor system according to claim 8, wherein said first means includes means for delaying start of the first operation by said operation means for the succeeding decoded instruction.

10. A data processor system according to claim 8, wherein said first means includes second means for controlling the execution by said first operation means of the succeeding decoded instruction so that the output data signal provided from said first operation menas for the succeeding decoded instruction is written into one of said first registers after the output data signal provided from said second operation means is written into one of said second registers, when the register number designated by the preceding decoded instruction for storage of an output data signal of the second operation is the same as the register number designated by the succeeding decoded instruction for storage of an output data signal of the first operation.

11. A data processor system according to claim 10, wherein said first means includes means for delaying the start of the first operation by said first operation means for the succeeding decoded instruction.

* * * * *